US010180069B2

(12) United States Patent
Coupe et al.

(10) Patent No.: US 10,180,069 B2
(45) Date of Patent: Jan. 15, 2019

(54) METHOD OF FABRICATING A COMPOSITE MATERIAL BLADE HAVING INTERNAL CHANNELS, AND A COMPOSITE MATERIAL TURBINE ENGINE BLADE

(75) Inventors: Dominique Coupe, Le Haillan (FR); Bruno Jacques Gerard Dambrine, Le Chatelet en Brie (FR); Jean-Noel Mahieu, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1477 days.

(21) Appl. No.: 13/575,170

(22) PCT Filed: Jan. 20, 2011

(86) PCT No.: PCT/FR2011/050107
§ 371 (c)(1), (2), (4) Date: Oct. 2, 2012

(87) PCT Pub. No.: WO2011/092416
PCT Pub. Date: Aug. 4, 2011

(65) Prior Publication Data
US 2013/0017094 A1 Jan. 17, 2013

(30) Foreign Application Priority Data
Jan. 26, 2010 (FR) ..................................... 10 50503

(51) Int. Cl.
*F01D 5/28* (2006.01)
*B29C 70/24* (2006.01)
(Continued)

(52) U.S. Cl.
CPC .............. *F01D 5/282* (2013.01); *B29C 33/52* (2013.01); *B29C 70/24* (2013.01); *B29C 70/48* (2013.01);
(Continued)

(58) Field of Classification Search
None
See application file for complete search history.

(56) References Cited

U.S. PATENT DOCUMENTS 4,885,973 A * 12/1989 Spain ....................... D04C 1/02 156/148
6,746,755 B2 * 6/2004 Morrison .................. B32B 3/18 244/123.14
(Continued)

FOREIGN PATENT DOCUMENTS

FR 2 929 149 10/2009
JP 8 207078 8/1996
WO WO 2010061139 A2 * 6/2010 ............. B29B 11/16

OTHER PUBLICATIONS

International Search Report dated Mar. 25, 2011 in PCT/FR11/50107 Filed Jan. 20, 2011.

*Primary Examiner* — Jason Shanske
*Assistant Examiner* — Michael Sehn
(74) *Attorney, Agent, or Firm* — Oblon, McClelland, Maier & Neustadt, L.L.P.

(57) ABSTRACT

A turbine engine blade made of composite material including fiber reinforcement obtained by weaving a first plurality of yarns with a second plurality of yarns, the yarns of the first plurality of yarns being arranged in successive layers and extending in a longitudinal direction of the fiber blank corresponding to a longitudinal direction of the blade, the reinforcement being densified by a matrix. The blade includes one or more internal channels extending in the longitudinal direction of the blade.

7 Claims, 2 Drawing Sheets

(51) Int. Cl.

| | |
|---|---|
| ***B29C 70/48*** | (2006.01) |
| ***B29D 99/00*** | (2010.01) |
| ***F01D 5/18*** | (2006.01) |
| ***B29C 33/52*** | (2006.01) |
| ***D03D 25/00*** | (2006.01) |
| *B29L 31/08* | (2006.01) |

(52) U.S. Cl.

CPC ....... *B29D 99/0025* (2013.01); *D03D 25/005* (2013.01); *F01D 5/187* (2013.01); *B29L 2031/08* (2013.01); *F05D 2260/20* (2013.01); *F05D 2300/21* (2013.01); *F05D 2300/224* (2013.01); *Y10T 29/49337* (2015.01)

(56) References Cited

U.S. PATENT DOCUMENTS

| | | | | |
|---|---|---|---|---|
| 7,101,154 | B2 * | 9/2006 | Dambrine | B29C 70/48<br>29/889.71 |
| 7,837,446 | B2 * | 11/2010 | McMillan | F01D 5/282<br>416/224 |
| 8,846,147 | B2 * | 9/2014 | Eberling-Fux | C04B 35/52<br>427/249.2 |
| 2003/0059577 | A1 | 3/2003 | Morrison et al. | |
| 2008/0145234 | A1 * | 6/2008 | Lee | B22C 9/103<br>416/96 R |
| 2011/0027097 | A1 * | 2/2011 | Bertrand | B21K 3/04<br>416/232 |

* cited by examiner

METHOD OF FABRICATING A COMPOSITE MATERIAL BLADE HAVING INTERNAL CHANNELS, AND A COMPOSITE MATERIAL TURBINE ENGINE BLADE

BACKGROUND OF THE INVENTION

The invention relates to turbine engine blades having internal channels.

In order to reduce noise and turbulence at the root of a blade, it is known to make internal channels within blades, which channels open out in the vicinities of the root and of the tip of the blade. These internal channels thus form a suck/blow device that draws in (sucks) some of the air level with the root of the blade and exhausts it (blows it out) level with the tip of the blade, thereby enabling a portion of the boundary layer in the proximity of the rotor to be absorbed.

Such blades provided with such suck/blow devices are generally made of a metal material, with the internal channels being hollowed out in the mass of the blade.

Nevertheless, machining internal channels in blades of metal material is quite difficult and can only be done on blades presenting shapes that are relatively simple. In particular, it is not possible to machine internal channels in metal blades that present a twisted shape.

In order to obtain blades of lighter weight, it is known to make blades out of composite material, i.e. by making parts of a structure that comprises fiber reinforcement densified by a matrix.

The technique that is generally used consists in forming a stack of pre-impregnated unidirectional sheets or plies (draping) that are placed in a mold with the successive plies being oriented in different directions, prior to compacting and polymerizing in an autoclave.

In another technique that is more recent and that provides better performance, the blade is fabricated by three-dimensionally weaving a fiber preform and then densifying the preform with a matrix. Document EP 1 526 285 describes a method of fabricating such a blade.

Nevertheless, known blades of composite material do not include internal channels. Machining internal channels in a blade of composite material can spoil the properties and the strength of the blade. Drilling one or more channels may in particular lead to certain reinforcing yarns being damaged or even broken, thereby harming the cohesion of the fiber reinforcement (by interrupting the paths along which forces are transmitted, which paths are formed by the reinforcing yarns).

Nevertheless, composite material blades represent a solution for the future, in particular because of their light weight and because of their excellent mechanical properties.

OBJECT AND SUMMARY OF THE INVENTION

It is therefore desirable for the turbines and compressors of turbine engines to be able to have composite material blades available that include one or more internal channels, while also having the required mechanical properties. It is also desirable for such blades to have shapes that are relatively complex, such as being twisted.

To this end, the present invention provides a method of fabricating a turbine engine blade out of composite material comprising fiber reinforcement densified by a matrix, the method comprising:

- making a fiber blank by weaving a first plurality of yarns with a second plurality of yarns, the yarns of said first plurality being arranged in successive layers and extending in the longitudinal direction of the fiber blank corresponding to the longitudinal direction of the blade to be made;
- shaping the fiber blank to obtain a preform of the blade to be made; and
- densifying the preform by impregnating said preform with a liquid composition containing a precursor for the material of the matrix in order to obtain a blade comprising fiber reinforcement constituted by said preform and densified by the matrix;

in which method, at least one layer of yarns in the first plurality of yarns situated in the internal portion of the fiber blank includes one or more yarns of sacrificial material that are eliminated after the preform has been densified in order to form one or more internal channels in the blade.

Thus, by the method of the invention, it is possible to fabricate composite material blades having internal channels, while also preserving the mechanical integrity of the blade structure. In the method of the invention, the channels are formed without spoiling the continuity of reinforcing yarns adjacent to the channels.

Furthermore, since the sacrificial yarns are included in the reinforcement before the fiber blank is shaped, it is possible to make blades of complex shapes, in particular blades that are of twisted shapes, that also include internal channels.

The sacrificial material may be selected, particularly but not exclusively, from at least one of the following materials:

- a hot-melt material such as polyvinyl acetate or polyethylene; and
- a material suitable for being dissolved by a solvent (water, alcohol, etc.) such as a soluble polymer, e.g. polyvinyl alcohol (PVA).

In an aspect of the invention, the fiber blank is made by three-dimensionally weaving at least yarns of the second plurality of yarns linking together yarns of the first plurality of yarns over a plurality of layers. The three-dimensional weaving may be multi-layer weaving with a weave of a type selected from at least one of the following weaves: satin, multi-satin, multi-plain, and interlock.

The yarns of the first plurality of yarns other than the yarns of sacrificial material and the yarns of the second plurality of yarns may in particular be ceramic or carbon yarns.

The weight of the yarns of sacrificial material is determined as a function of the size of the internal channels that are to be made in the blade.

The invention also provides a turbine engine blade made of composite material comprising fiber reinforcement obtained by weaving a first plurality of yarns with a second plurality of yarns, the yarns of said first plurality of yarns being arranged in successive layers and extending in the longitudinal direction of the fiber blank corresponding to the longitudinal direction of the blade to be made, said reinforcement being densified by a matrix, the blade including one or more internal channels extending in the longitudinal direction of said blade.

The blade may in particular present a twisted shape. In an aspect of the invention, the blade is made of a composite material having an organic matrix. The airfoil of the blade may also present a profile of varying thickness.

The invention also provides a turbine engine fitted with a blade of the invention or fabricated using the method as defined above.

BRIEF DESCRIPTION OF THE DRAWINGS

The invention can be better understood from the following description given by way of non-limiting indication with reference to the accompanying drawings, in which.

DETAILED DESCRIPTION OF EMBODIMENTS

Figure 1:
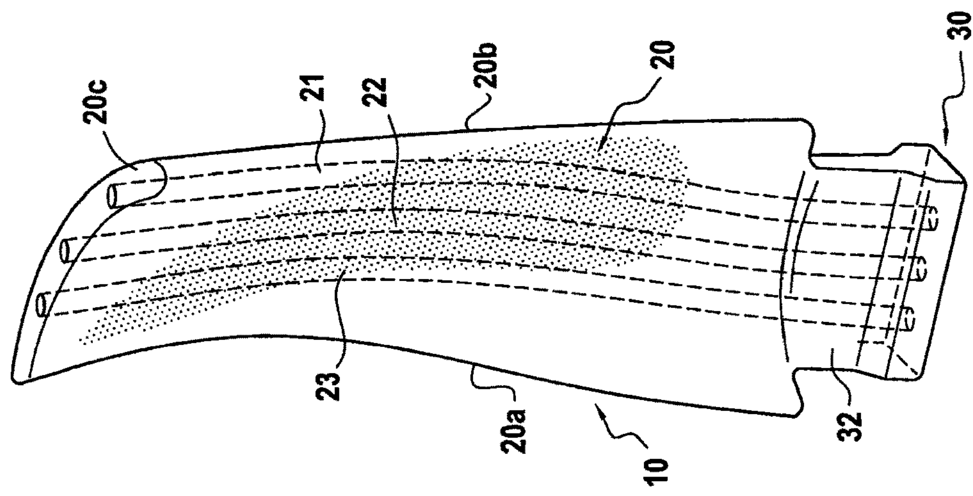
FIG. 1 is a perspective view of a turbine engine blade made of composite material and including internal channels.

The invention is applicable to various types of turbine engine blade, in particular compressor blades and turbine blades of various gas turbine spools, e.g. a rotor wheel blade of a low pressure (LP) turbine, such as the blade shown in FIG. 1.

The blade 10 of FIG. 1 comprises, in well-known manner, an airfoil 20, a root 30 formed by a portion of greater thickness, e.g. having a bulb-shaped section, and extended by a tang 32. The airfoil 20 extends in a longitudinal direction from the root 30 to a tip 20*c*, and in cross-section it presents a curved profile of thickness that varies between its leading edge 20*a* and its trailing edge 20*b*.

The blade 10 is mounted on a turbine rotor (not shown) by engaging the root 30 in a housing of complementary shape formed in the periphery of the rotor.

In accordance with the invention, the blade 10 also includes three internal channels 21, 22, and 23 for sucking in air via the root 30 and for blowing it out via the tip 20*c* of the airfoil 20.

Figure 2:
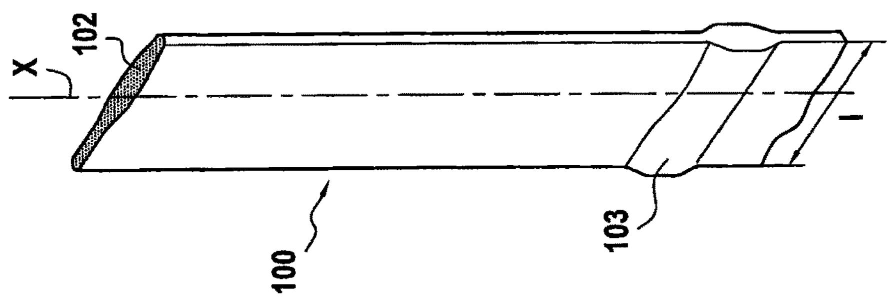
FIG. 2 is a highly diagrammatic view of a three-dimensionally-woven fiber blank for use in making a fiber preform for a blade such as that shown in FIG. 1.

FIG. 2 is a highly diagrammatic view of a fiber blank 100 from which a blade fiber preform can be shaped so that a composite material blade such as that shown in FIG. 1 can be obtained after the preform has been densified by a matrix, and optionally machined.

The blank 100 is obtained by three-dimensional weaving or by multi-layer weaving, and after it has been shaped it is to constitute a preform for the airfoil and for the root of a blade.

The blank 100 is made in the form of a strip extending generally in a direction X corresponding to the longitudinal direction of the blade that is to be made. The blank 100 presents thickness that varies and that is determined as a function of the thickness of the airfoil profile of the blade that is to be made. In its portion that is to form a root preform, the fiber blank presents extra thickness 103 determined as a function of the thickness of the root of the blade that is to be made. The blank 100 has a width l that is selected as a function of the developed (laid out flat) length of the profile of the airfoil and of the root of the blade that is to be made.

One way of three-dimensionally weaving the fiber blank 100 is described below in greater detail.

It is assumed that the weaving is performed with warp yarns that extend in the longitudinal direction X of the blank, i.e. in the longitudinal direction of the blade that is to be made, it being observed that weaving using weft yarns that extend in this direction is also possible.

The enlarged portion 102 providing the variation in the thickness of the blank 100 across its width is obtained by using warp yarns of varying weight. In a variant, or in addition, it is possible to vary the count of the warp yarns (the number of yarns per unit length in the weft direction), a smaller count enabling greater thinning while the preform is being shaped by molding.

Figure 5:
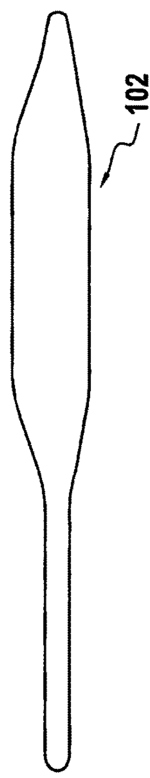
FIG. 5 is a section view showing the profile, laid out flat, of a blade such as that of FIG. 2.
Figure 6:
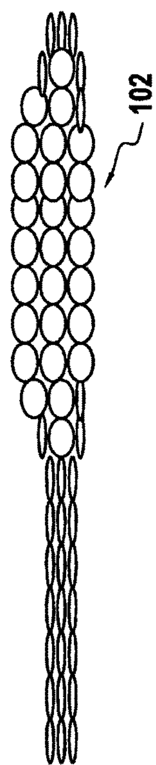
FIG. 6 is a section view through a set of warp yarn layers enabling a profile of the kind shown in FIG. 5 to be obtained.

Thus, in order to obtain a blade airfoil profile as shown in flat projection in FIG. 5, it is possible to use three layers of warp yarns of varying weight and count, as shown in FIG. 6.

In one embodiment, the yarns used, other than those for forming internal channels in the manner explained below, may be yarns made of carbon or of silicon carbide (SiC), e.g. having a weight (number of filaments) of 0.5K (500 filaments). In order to form the thickness variation 102, yarns of greater weight are used, e.g. of weight equal to 1K. If 1K yarns are not available, they may be obtained by uniting two 0.5K yarns by wrapping.

Naturally, depending on the weights of the available yarns, various combinations of numbers of layers of yarns and variations in count and in weight may be adopted for the profile that is to be obtained.

Figure 7A:
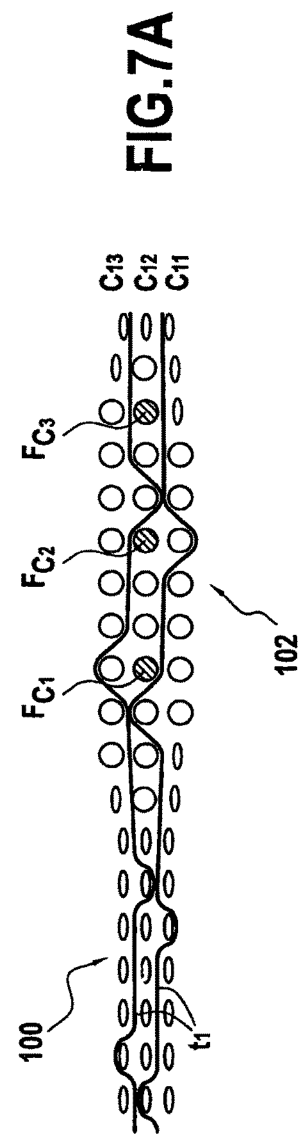
FIGS. 7A and 7B are warp section views showing one way of weaving the FIG. 2 fiber blank.
Figure 7B:
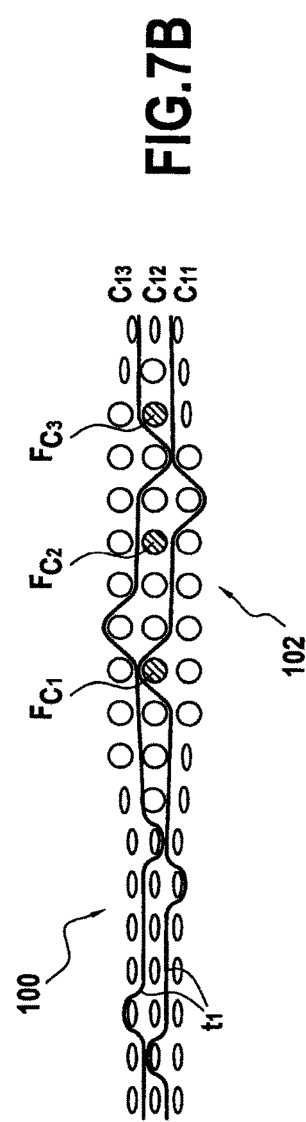

FIGS. 7A and 7B are warp section views showing two successive planes of a weave that can be used for weaving the fiber blank 100.

The strip of the fiber blank 100 comprises a set of warp yarn layers, with the number of these layers in this example being equal to three (layers $C_{11}$, $C_{12}$, $C_{13}$). The warp yarns are linked together by weft yarns $t_1$, by three-dimensional weaving.

In the example shown, the weaving is multi-layer weaving performed using a satin or multi-satin type weave. Other types of three-dimensional weaving could be used, for example a multi-layer weave using a multi-plain weave or an "interlock" weave. The term "interlock" is used herein to mean a weave in which each layer of weft yarns links together a plurality of layers of warp yarns with all of the yarns in a given weft column having the same movement in the weave plane.

Various ways of performing three-dimensional weaving are described in particular in document WO 2006/136755, the content of which is incorporated herein by way of reference.

In accordance with the invention, three 1K yarns $F_{C1}$, $F_{C2}$, and $F_{C3}$ of the layer $C_{12}$, i.e. the internal layer of warp yarns that is situated between the warp yarn layers $C_{11}$ and $C_{13}$, are made of a sacrificial or temporary material, i.e. a material that is suitable for being eliminated after the preform has been densified, e.g. by being evaporated or dissolved. The yarns $F_{C1}$, $F_{C2}$, and $F_{C3}$ may be of different weights depending on the sizes of the internal channels to be made within the blade.

Naturally, the number of warp yarn layers may be greater depending on the intended thickness and mechanical properties. Whatever the number of warp yarn layers in the fiber blank (greater than or equal to 3), the sacrificial yarns may be inserted in any layer of warp yarns situated between the two surface layers of warp yarns that are to form the skin of the blade.

The yarns $F_{C1}$, $F_{C2}$, and $F_{C3}$ may in particular be formed with the following sacrificial materials:

- a hot-melt material such as polyvinyl acetate or polyethylene; or
- a material that is suitable for being dissolved by a solvent (water, alcohol, etc.) such as a soluble polymer, e.g. a PVA.

When forming fiber reinforcement with ceramic fibers and forming a matrix by impregnation with a liquid, it is possible to use for the sacrificial yarns a silicone that is eliminated by being evaporated.

The extra thickness 103 may be obtained by using weft yarns of greater weight and additional layers of weft yarns, the three warp yarns $F_{C1}$, $F_{C2}$, and $F_{C3}$ being also present in the extra thickness 103 in an internal layer of weft yarns.

Naturally, various combinations of weft yarn numbers and weft yarn weights may be adopted to form the extra thickness 103.

Figure 4:
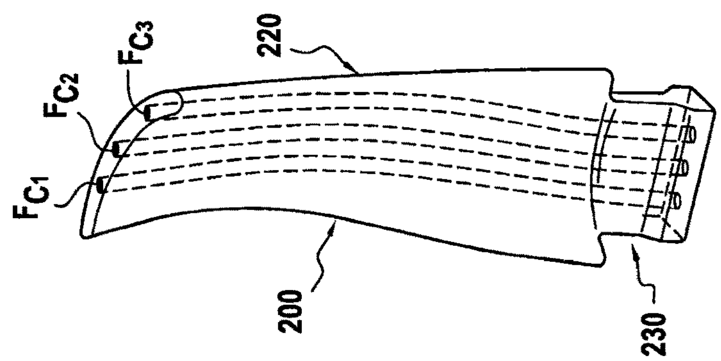
FIGS. 3 and 4 show successive steps in making a fiber preform for a blade such as that shown in FIG. 1, starting from the fiber blank of FIG. 2.
Figure 3:
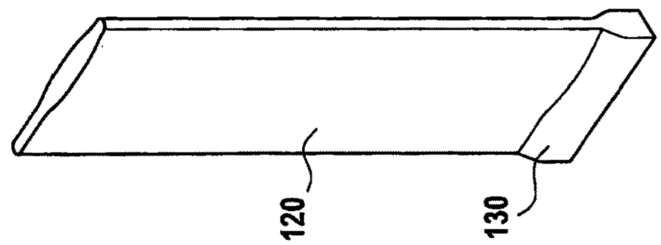

FIGS. 3 and 4 show, very diagrammatically, how a fiber preform of shape similar to that of the blade that is to be made can be obtained from the fiber blank 100.

In FIG. 3, the fiber blank 100 is cut at one end through the extra thickness 103 and at another end so as to have a strip 120 of length corresponding to the longitudinal dimension of the blade that is to be made, with an enlarged portion 130 formed by part of the extra thickness 103 and situated at a location that corresponds to the position of the root of the blade that is to be made.

A fiber preform 200 of the blade that is to be made is then obtained by molding the strip 102, while deforming it so as to reproduce the curved and twisted profile of the blade airfoil, as shown in FIG. 4. This produces a preform having an airfoil preform portion 220 and a root preform portion 230 (including a tang preform portion).

More precisely, the fiber preform 200 is obtained by densifying the fiber blank 100 with a matrix.

Densification of the fiber blank consists in filling the pores of the blank throughout all or part of its volume with the material that constitutes the matrix.

The matrix of the composite material constituting the blade may be obtained in known manner using the liquid technique. The liquid technique consists in impregnating the fiber blank with a liquid composition containing an organic precursor of the matrix material. The organic precursor is usually in the form of a polymer, such as a thermoplastic or thermosetting resin, possibly diluted in a solvent. The blank is placed in a mold that may be closed in leaktight manner, and having a recess with the final shape of the molded part, which recess is capable in particular of presenting a twisted shape that corresponds to the final shape of the blade. Thereafter, the mold is closed and the liquid precursor of the matrix (e.g. a resin) is injected to fill the entire recess so as to impregnate all of the fiber portion of the preform.

The precursor is transformed into an organic matrix, i.e. it is polymerized, by applying heat treatment, generally by heating the mold, after eliminating any solvent and curing the polymer, the preform being kept continuously within the mold that is of a shape corresponding to the shape of the blade. The organic matrix may be obtained in particular starting from epoxy resins, such as the high-performance epoxy resin sold by the supplier Cytec under the reference PR 520, or liquid precursors for carbon or ceramic matrices. Under such circumstances, if the sacrificial yarns $F_{C1}$, $F_{C2}$, and $F_{C3}$ are made of a hot-melt material, the material is selected so as to melt at a temperature that is higher than the temperature for the polymerization heat treatment, which temperature usually lies in the range approximately 180° C. to 200° C.

The matrix may also be a ceramic matrix obtained by impregnating the fiber blank with a ceramic precursor resin, e.g. such as a polycarbosilane resin that is a precursor of silicon carbide (SiC), or a polysiloxane resin that is a precursor of SiCO, or a polyborocarbosilazane resin that is a precursor of SiCNB, or a polysilazane resin that is a precursor of SiCN.

According to an aspect of the invention, the fiber blank may be densified by the well-known resin transfer molding (RTM) method. In the RTM method, the fiber blank 100 is placed in a mold presenting the outside shape of the blade. A thermosetting resin is injected into the inside space of the mold that contains the fiber blank. A pressure gradient is generally established in that inside space between the location where the resin is injected and the orifices for evacuating the resin so as to control and optimize the impregnation of the blank by the resin.

By way of example, the resin used may be an epoxy resin. Resins adapted to RTM methods are well known. They preferably present low viscosity so as to make it easier to inject them amongst the fibers. The temperature class and/or the chemical nature of the resin is/are determined as a function of the thermomechanical stresses to which the part is to be subjected. Once the resin has been injected throughout the reinforcement, it is polymerized by heat treatment in accordance with the RTM method.

After injection and polymerization, the part is unmolded. In the end, the part is trimmed in order to remove excess resin and its chamfers are machined. No other machining is needed since, given that the part is a molded part, it complies with the required dimensions.

Once densification has been completed, the warp yarns $F_{C1}$, $F_{C2}$, and $F_{C3}$ are eliminated. The treatment used to eliminate these yarns depends on the sacrificial material constituting the yarns $F_{C1}$, $F_{C2}$, and $F_{C3}$. By way of example, the elimination treatment may correspond to heat treatment performed at a temperature greater than or equal to the temperature at which the material vaporizes, or it may correspond to soaking the preform in a solution that serves to dissolve the material of the yarns that are to be eliminated.

After the yarns $F_{C1}$, $F_{C2}$, and $F_{C3}$ have been eliminated, the blade 10 of FIG. 1 is obtained, i.e. a blade presenting a twisted shape and including three internal channels 21 to 23 constituting a suck/blow device when the blade is mounted on a turbine engine rotor (not shown).

The invention claimed is:

1. A method of fabricating a turbine engine blade out of composite material comprising fiber reinforcement densified by a matrix, the method comprising:

making a fiber blank by weaving a first plurality of warp yarns with a second plurality of weft yarns, the warp yarns of the first plurality being arranged in successive layers and extending in a longitudinal direction of the fiber blank corresponding to a longitudinal direction of the blade to be made, one layer of warp yarns in the first plurality of warp yarns being woven with the second plurality of weft yarns and including one or more yarns fully consisting of sacrificial material;

shaping the fiber blank to obtain a preform of the blade to be made;

densifying the preform by impregnating the preform with a liquid composition including a precursor for the material of the matrix to obtain a blade having fiber reinforcement constituted by the preform and densified by the matrix; and after the preform has been densified, completely eliminating the one or more yarns fully consisting of sacrificial material to form an internal channel in the blade, wherein the internal channel extends in the longitudinal direction of the blade and includes a first end at a bottom surface of a root of the blade and a second end at a tip of an airfoil of the blade, and wherein the one layer of warp yarns including the one or more yarns fully consisting of sacrificial material is an internal layer of warp yarns situated between two surface layers forming a skin of the blade.

2. The method according to claim 1, wherein the sacrificial material is selected from at least one of the following materials:

a hot-melt material; and a material that can be dissolved by a solvent.

3. The method according to claim 2, wherein the one or more yarns of sacrificial material are eliminated by heat treatment or by applying a solvent.

4. The method according to claim 1, wherein the fiber blank is made by three-dimensionally weaving at least yarns of the second plurality of weft yarns linking together yarns of the first plurality of warp yarns over a plurality of layers.

5. The method according to claim 4, wherein the three-dimensional weaving is multi-layer weaving with a weave of a type selected from at least one of the following weaves: satin, multi-satin, multi-plain, and interlock.

6. The method according to claim 1, wherein the yarns of the first plurality of warp yarns other than the one or more yarns made of sacrificial material, and the yarns of the second plurality of weft yarns, are made of ceramic or carbon material.

7. The method according to claim 1, wherein weights of the yarns of sacrificial material is determined as a function of sizes of the internal channels formed in the blade.

* * * * *